United States Patent
Sikri et al.

(10) Patent No.: US 8,964,617 B2
(45) Date of Patent: Feb. 24, 2015

(54) METHODS AND DEVICES FOR REGULATING POWER IN WIRELESS RECEIVER CIRCUITS

(71) Applicant: QUALCOMM Incorporated, San Diego, CA (US)

(72) Inventors: Divaydeep Sikri, Farnborough (GB); Farrukh Rashid, Farnborough (GB); Helena Deirdre O'Shea, San Diego, CA (US); Cetin Altan, Farnborough (GB); Wolfram Pieperhoff, Winchester (GB)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/739,687

(22) Filed: Jan. 11, 2013

(65) Prior Publication Data

US 2013/0322313 A1 Dec. 5, 2013

Related U.S. Application Data

(60) Provisional application No. 61/653,357, filed on May 30, 2012.

(51) Int. Cl.
*G08C 17/00* (2006.01)
*H04W 52/02* (2009.01)

(52) U.S. Cl.
CPC ...... *H04W 52/0206* (2013.01); *H04W 52/0229* (2013.01); *H04W 52/028* (2013.01); *Y02B 60/50* (2013.01)
USPC .......................................................... 370/311

(58) Field of Classification Search
USPC ......... 370/310, 311, 314, 328–339, 347, 350; 375/334, 362, 364
See application file for complete search history.

(56) References Cited

U.S. PATENT DOCUMENTS 7,236,746 B2    6/2007  Peric
8,175,567 B2    5/2012  Hoefel et al.
(Continued)

FOREIGN PATENT DOCUMENTS

WO    WO-9820632 A1    5/1998
WO    WO-9921390 A2    4/1999
(Continued)

OTHER PUBLICATIONS

International Search Report and Written Opinion—PCT/US2013/042734, International Search Authority—European Patent Office, Nov. 21, 2013.
Partial International Search Report—PCT/US2013/042734—ISA/EPO—Aug. 28, 2013.
(Continued)

*Primary Examiner* — Frank Duong
(74) *Attorney, Agent, or Firm* — QUALCOMM IP Department; James Hunt Yancey, Jr.

(57) ABSTRACT

Access terminals are adapted to regulate power in wireless receiver circuits. In one example, access terminals include a communications interface with at least one wireless receiver circuit. A processing circuit coupled with the communications interface can receive a transmission during a Frequency Correction Channel (FCCH) frame. Following the received transmission, at least a portion of the receiver circuit may be powered down. A determination may also be made whether the received transmission was reliable. The receiver circuit can subsequently be powered up, and another transmission can be received on a subsequent channel. When the received transmission was sufficiently reliable, the other transmission may be a transmission during a Synchronization Channel (SCH) frame. When the received transmission is not sufficiently reliable, the other transmission may be another transmission received during a subsequent Frequency Correction Channel (FCCH) frame. Other aspects, embodiments, and features are also claimed and described.

24 Claims, 7 Drawing Sheets

(56) References Cited

U.S. PATENT DOCUMENTS

| | | |
|---|---|---|
| 2003/0031140 A1 | 2/2003 | Oprescu-Surcobe et al. |
| 2005/0078774 A1 | 4/2005 | Rick et al. |
| 2006/0067437 A1* | 3/2006 | Vis et al. .................. 375/343 |
| 2006/0072685 A1 | 4/2006 | Gong et al. |
| 2007/0140388 A1 | 6/2007 | Mondet et al. |
| 2010/0161775 A1 | 6/2010 | Master et al. |
| 2011/0194571 A1 | 8/2011 | Ozluturk et al. |
| 2011/0280141 A1 | 11/2011 | Chin et al. |
| 2012/0178358 A1 | 7/2012 | Haverty |

FOREIGN PATENT DOCUMENTS

| | | |
|---|---|---|
| WO | WO-2008157686 A1 | 12/2008 |
| WO | WO-2011112006 A2 | 9/2011 |

OTHER PUBLICATIONS

Taiwan Search Report—TW102118983—TIPO—Oct. 30, 2014. See enclosed TW Search Report in Taiwanese and English Language Translation Provided by TW Counsel.

* cited by examiner

METHODS AND DEVICES FOR REGULATING POWER IN WIRELESS RECEIVER CIRCUITS

PRIORITY CLAIM

The present Application for Patent claims priority to Provisional Application No. 61/653,357 entitled "METHODS AND DEVICES FOR REGULATING RECEIVER POWER FOR CELL ACQUISITIONS" filed May 30, 2012, and assigned to the assignee hereof, and expressly incorporated by reference herein as if fully set forth below for all applicable purposes.

TECHNICAL FIELD

The technology discussed in this patent application relates generally to wireless communication, and more specifically to methods and devices for facilitating power conservation during cell acquisitions.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Access terminals adapted to access one or more wireless communications systems are becoming increasingly popular, with consumers often using power-intensive applications that run on the access terminals. Access terminals are typically battery-powered and the amount of power a battery can provide between charges is generally limited.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some instances, features which may assist in extending the operating life of access terminals between power source update (e.g., recharging a battery) can be beneficial. Various features and aspects of the present disclosure are adapted to facilitate power conservation by regulating power of a receiver during cell acquisitions. According to at least one aspect of the present disclosure, access terminals may include a communications interface and a storage medium coupled with a processing circuit. The processing circuit can be adapted to receive a Frequency Correction Channel (FCCH) transmission via the receiver circuit. Following receipt of the Frequency Correction Channel (FCCH) transmission, the processing circuit can be adapted to power down at least a portion of the receiver circuit. The processing circuit may further power up the at least a portion of the receiver circuit, and receive another transmission on a subsequent channel via the receiver circuit.

Further aspects provide methods operational on access terminals and/or access terminals including means to perform such methods. One or more examples of such methods may include receiving a Frequency Correction Channel (FCCH) transmission. At least a portion of a receiver circuit may be powered down after receiving the Frequency Correction Channel (FCCH) transmission. The at least a portion of the receiver circuit may subsequently be powered back up, and another transmission may be received on a subsequent channel.

Still further aspects include computer-readable storage mediums comprising programming operational on a computer, such as an access terminal. According to one or more examples, such programming may be adapted for causing a computer to receive a Frequency Correction Channel (FCCH) transmission, and power down at least a portion of a receiver circuit after receiving the Frequency Correction Channel (FCCH) transmission. The programming may also be adapted to cause a computer to power up the at least a portion of the receiver circuit, and receive another transmission on a subsequent channel.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the discussions are described below for 3rd Generation Partnership Project (3GPP) protocols and systems, and related terminology may be found in much of the following description. However, those of ordinary skill in the art will recognize that one or more aspects of the present disclosure may be employed and included in one or more other wireless communication protocols and systems.

Figure 1:
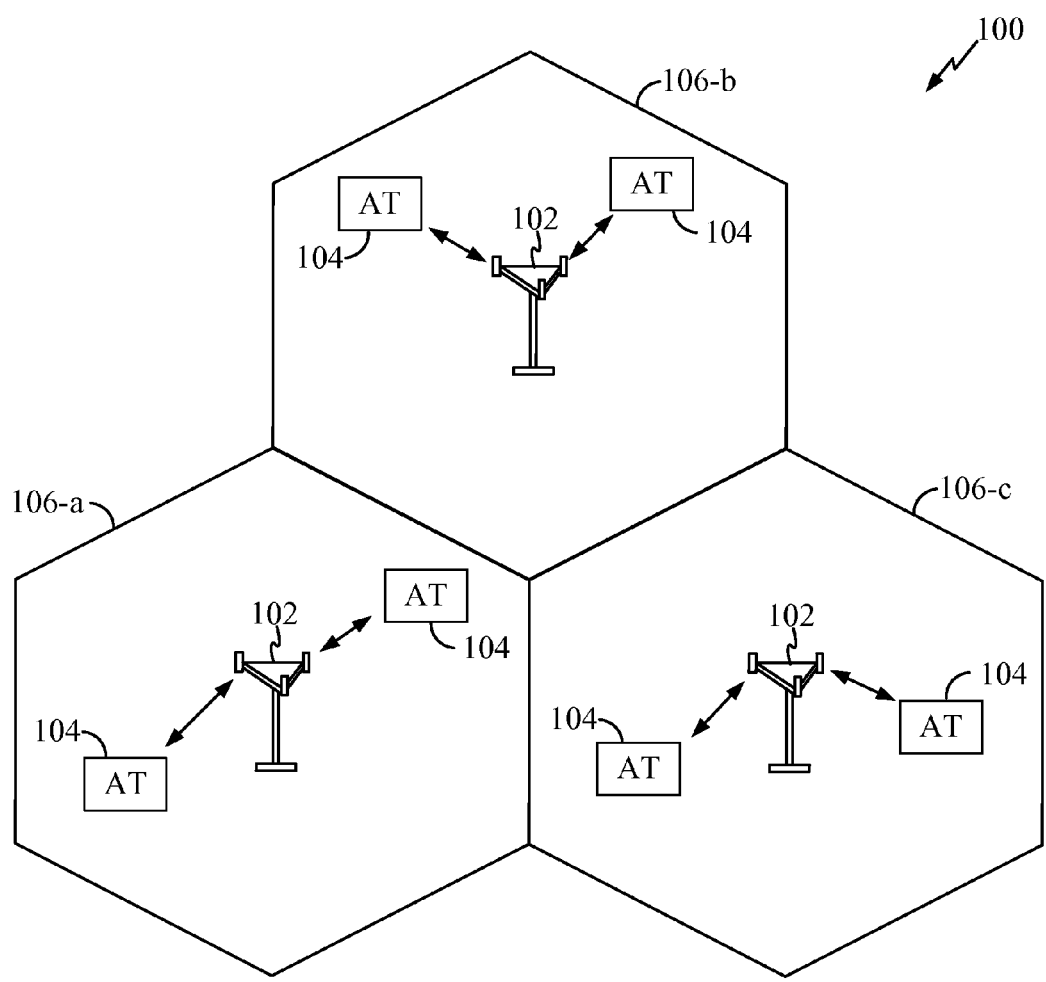
FIG. 1 is a block diagram illustrating an example of a network environment in which one or more aspects of the present disclosure may find application according to some embodiments.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, femto and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

Figure 2:
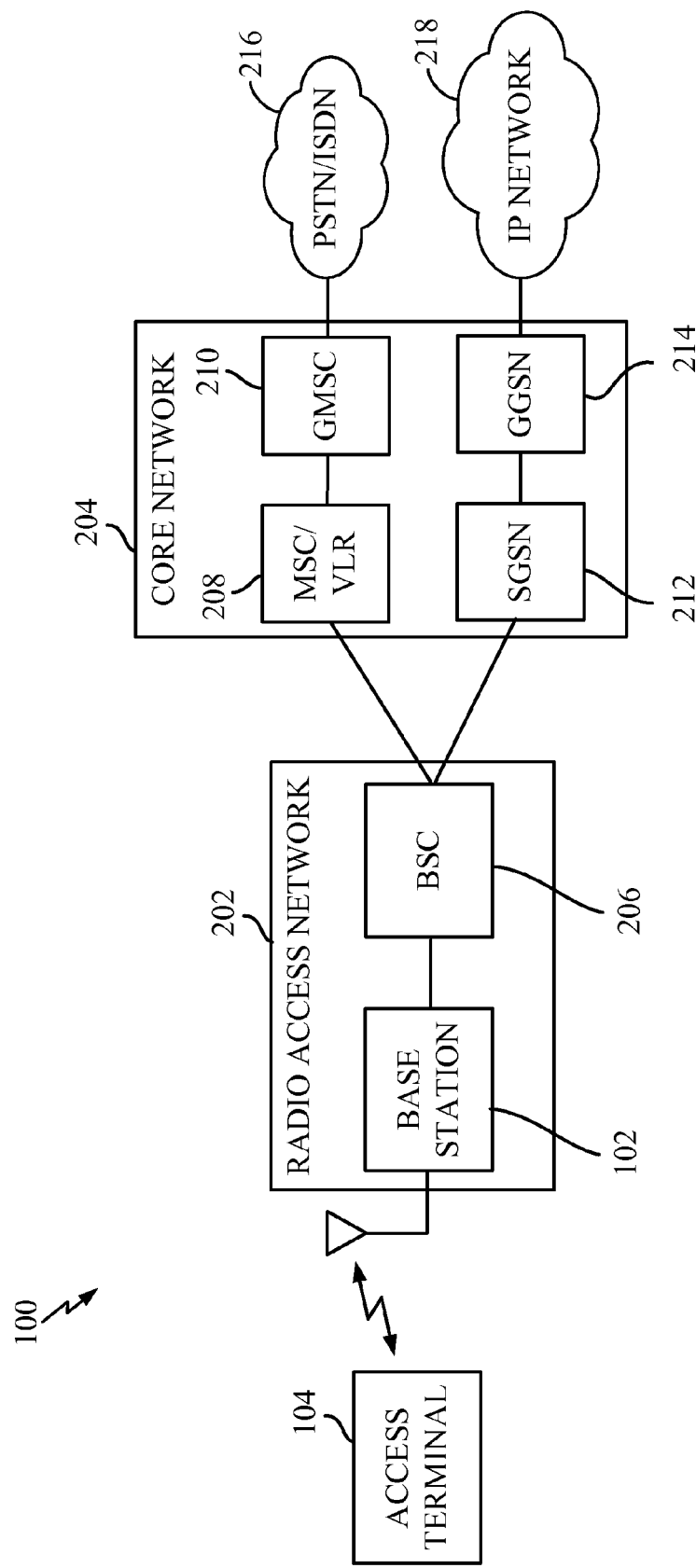
FIG. 2 is a block diagram illustrating select components of the wireless communication system of according to some embodiments.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
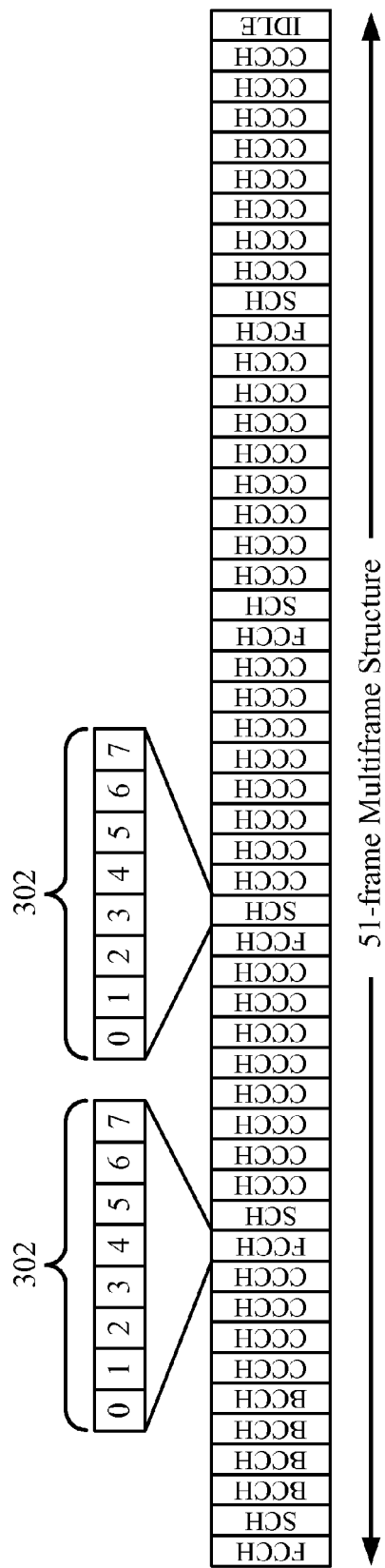
FIG. 3 is a block diagram illustrating one example of a 51-frame multiframe structure for GSM communications according to some embodiments.
Figure 4:
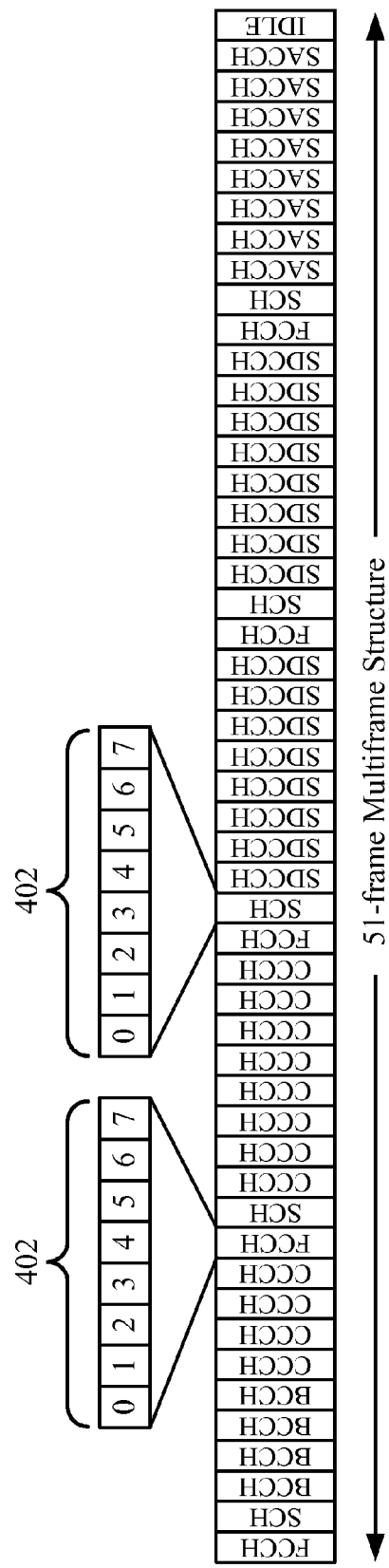
FIG. 4 is a block diagram illustrating another example of a 51-frame multiframe structure for GSM communications according to some embodiments.

As an access terminal 104 operates within the wireless communications system 100, the access terminal 104 may be connected with a serving cell, and may monitor one or more neighboring cells. To monitor a neighboring cell, the access terminal 104 typically employs a control channel carrier associated with the neighboring cell. The control channel can employ a 51-frame multiframe structure for sending information on the control channel. FIG. 3 illustrates an example of a 51-frame multiframe structure with TDMA mapping for Frequency Correction Channel (FCCH), Synchronization Channel (SCH), Broadcast Control Channel (BCCH), and Common Control Channel (CCCH). FIG. 4 illustrates another example of a 51-frame multiframe structure with TDMA mapping for Frequency Correction Channel (FCCH), Synchronization Channel (SCH), Broadcast Control Channel (BCCH), Common Control Channel (CCCH), Stand-alone Dedicated Control Channel (SDCCH), and Slow Associated Control Channel (SACCH).

In both the examples of a 51-frame multiframe structure, the Frequency Correction Channels (FCCH) and Synchronization Channels (SCH) occur every 10 or 11 frames. Each of these frames includes eight (8) burst periods 302, 402 numbered 0 through 7. The Frequency Correction Channel (FCCH) is a downlink-only control channel in the GSM air interface. The neighboring cell typically transmits a radio burst during the first burst period (e.g., burst period 0) of the Frequency Correction Channel (FCCH) frame including a pre-defined sequence (e.g., an all-zero sequence) that produces a fixed tone in the Gaussian minimum-shift keying (GMSK) modulator output. This tone enables the access terminal 104 to lock its local oscillator to the clock of the base station 102 for frequency synchronization. The Frequency Correction Channel (FCCH) is typically transmitted in a frame immediately before the Synchronization Channel (SCH), as shown in FIGS. 3 and 4. For example, in a GSM implementation, the Synchronization Channel (SCH) frame comes 4.615 ms (e.g., the length of one GSM frame) after the beginning of the Frequency Correction Channel (FCCH) frame. The Synchronization Channel (SCH) enables the access terminal 104 to quickly identify a nearby cell and synchronize to that cell's timing structures (e.g., TDMA structures). The neighboring cell typically transmits a radio burst during the first burst period (e.g., burst period 0) of the Synchronization Channel (SCH) frame including the current frame clock of the particular base station 102 associated with the cell, an identity code (e.g., base station identity code (BSIC)) associated with the base station 102, and an extended training sequence.

Figure 5:
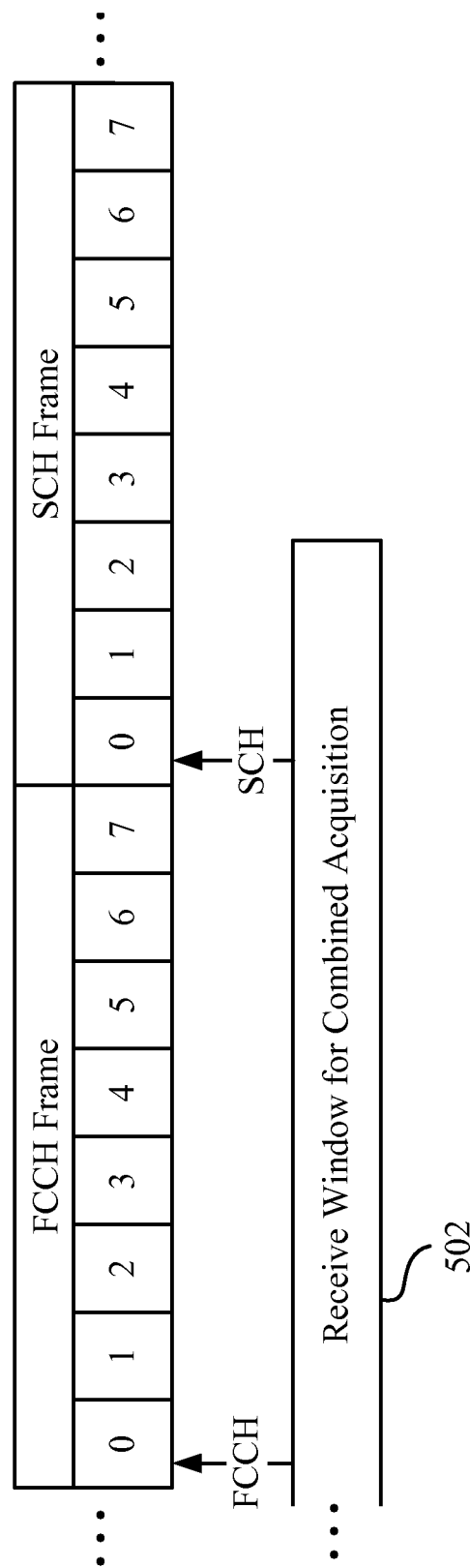
FIG. 5 is a block diagram illustrating FCCH frames and SCH frames in association with a receive window for a combined acquisition procedure according to at least one example according to some embodiments.

As part of the process for monitoring the one or more neighboring cells, the access terminal 104 typically ensures that it is synchronized with each neighboring cell by an acquisition procedure commonly referred to by those of skill in the art as a "combined acquisition procedure." During a combined acquisition procedure, the access terminal 104 initially detects the Frequency Correction Channel (FCCH) for frequency synchronization, followed by the Synchronization Channel (SCH) for time synchronization. Turning to FIG. 5, a magnified signaling format of a 51-frame multiframe structure is shown (such as those shown of FIGS. 3 and 4), depicting only a Frequency Correction Channel (FCCH) frame and a Synchronization Channel (SCH) frame.

When performing a typical combined acquisition procedure, the access terminal 104 opens a receive window 502 in order to continuously monitor the control channel carrier for capturing the Frequency Correction Channel (FCCH) to get a lock on the frequency, and the Synchronization Channel (SCH) to get time synchronization and decode the BSIC ID. After the Synchronization Channel (SCH) has been successfully decoded, and the frequency and timing are synchronized, the receive window 502 is closed. As used herein, a receive window, such as the receive window 502, includes a period of time when the access terminal 104 powers ON one or more components of a receiver circuit for monitoring the receiver circuit for received data and/or signaling.

As depicted in FIG. 5, the receive window 502 may be open for some period prior to the Frequency Correction Channel (FCCH). For instance, the access terminal 104 may open the receive window 502 some period prior to the Frequency Correction Channel (FCCH) to monitor for the Frequency Correction Channel (FCCH). In some instances with the access terminal 104 in idle mode, the receive window 502 can remain open for as many as almost 13 frames (about 60 milliseconds) in order to complete the frequency and timing synchronizations associated with the combined acquisition procedure. For example, referring to the last FCCH frame in FIG. 3, if the receive window 502 is opened during this last FCCH frame, but after the radio burst has already been transmitted during the first burst period (e.g., burst period 0), the receive window 502 will be open for the remaining portion of the FCCH frame, the SCH frame, 8 CCCH frames, the IDLE frame, the next FCCH frame and the next SCH frame, for a total of just under 13 full frames (about 60 milliseconds). Similarly, if the receive window 502 is opened in sufficient time to receive this last FCCH frame, but the tone received in the FCCH radio burst is not sufficiently reliable, then the receive window 502 will likewise be open until the next FCCH frame and the next SCH frame (more than 13 full frames in this case). For dedicated and transfer modes, the receive window 502 will be open multiple times for shorter durations to acquire neighboring cells because the neighboring cell acquisition typically occurs during the fixed idle periods similar to the idle periods shown in FIGS. 3 and 4.

Figure 6:
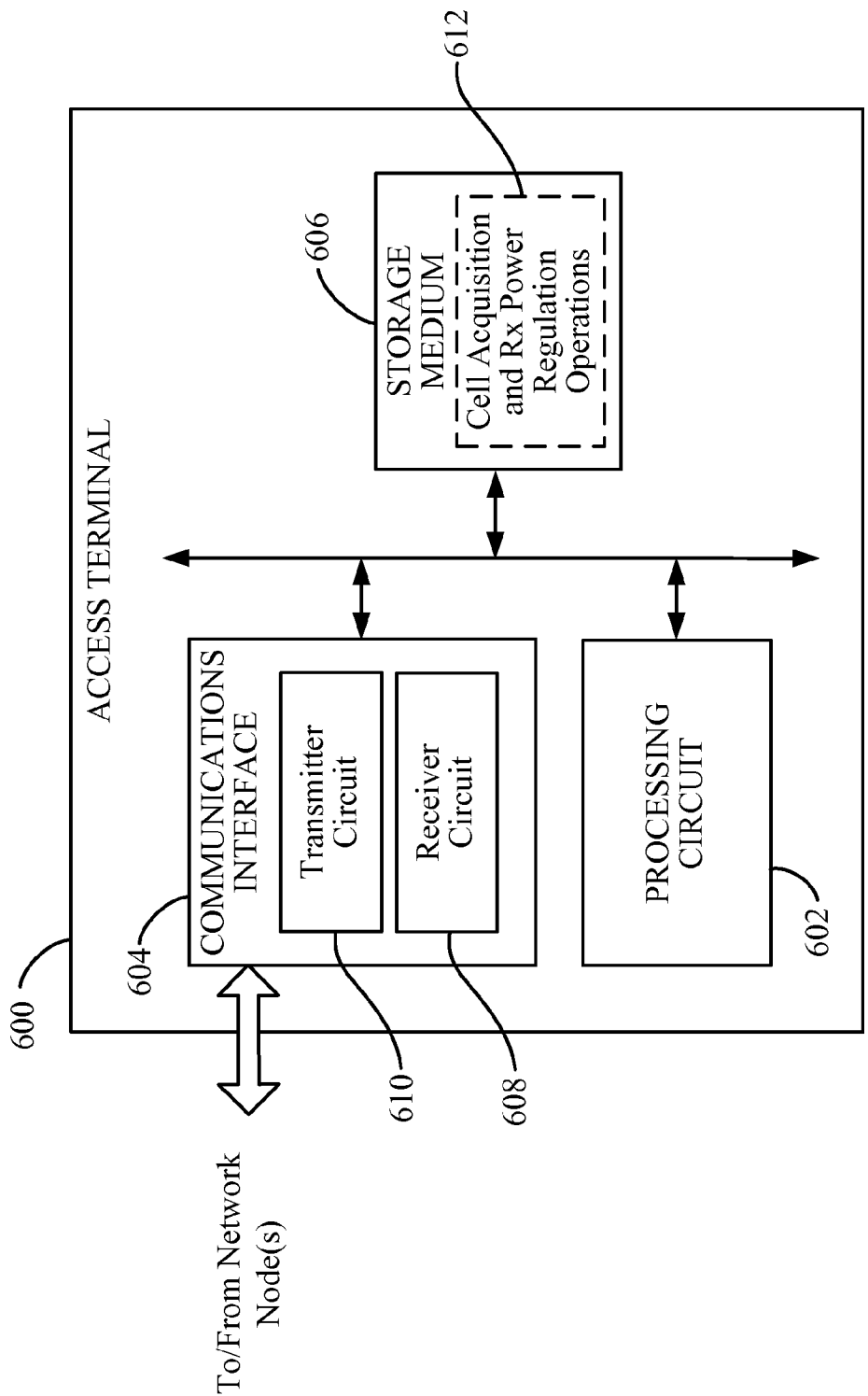
FIG. 6 is a block diagram illustrating select components of an access terminal according to some embodiments.

According to at least one aspect of the present disclosure, access terminals are adapted to conduct a combined acquisition procedure, where the receive window is closed (e.g., one or more receiver components are powered down or OFF) after detection of a Frequency Correction Channel (FCCH). The receive window is subsequently opened again (e.g., the one or more receiver components are powered up or ON) before reception of a Synchronization Channel (SCH) or before reception of a subsequent Frequency Correction Channel (FCCH). FIG. 6 is a block diagram illustrating select components of such an access terminal 600 according to at least one example. As shown, the access terminal 600 may include a processing circuit 602 coupled to or placed in electrical communication with a communications interface 604 and a storage medium 606.

The processing circuit 602 is arranged to obtain, process and/or send data, control data access and storage, issue commands, and control other desired operations. The processing circuit 602 may include circuitry adapted to implement desired programming provided by appropriate media in at least one example. For example, the processing circuit 602 may be implemented as one or more processors, one or more controllers, and/or other structure configured to execute executable programming. Examples of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 602 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 602 are for illustration and other suitable configurations within the scope of the present disclosure are also contemplated.

The processing circuit 602 is adapted for processing, including the execution of programming, which may be stored on the storage medium 606. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 604 is configured to facilitate wireless communications of the access terminal 600. For example, the communications interface 604 may include circuitry and/or programming adapted to facilitate the communication of information bi-directionally with respect to one or more network nodes. The communications interface 604 may be coupled to one or more antennas (not shown), and includes wireless transceiver circuitry, including at least one receiver circuit 608 (e.g., one or more receiver chains) and/or at least one transmitter circuit 610 (e.g., one or more transmitter chains). By way of example and not limitation, the at least one receiver circuit 608 may include circuitry, devices and/or programming associated with a data path (e.g., antenna, amplifiers, filters, mixers) and with a frequency path (e.g., a phase-locked loop (PLL) component).

The storage medium 606 may represent one or more computer-readable, machine-readable, and/or processor-readable devices for storing programming, such as processor executable code or instructions (e.g., software, firmware), electronic data, databases, or other digital information. The storage medium 606 may also be used for storing data that is manipulated by the processing circuit 602 when executing programming. The storage medium 606 may be any available media that can be accessed by a general purpose or special purpose processor, including portable or fixed storage devices, optical storage devices, and various other mediums capable of storing, containing and/or carrying programming. By way of example and not limitation, the storage medium 606 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 606 may be coupled to the processing circuit 602 such that the processing circuit 602 can read information from, and write information to, the storage medium 606. That is, the storage medium 606 can be coupled to the processing circuit 602 so that the storage medium 606 is at least accessible by the processing circuit 602, including examples where the storage medium 606 is integral to the processing circuit 602 and/or examples where the storage medium 606 is separate from the processing circuit 602 (e.g., resident in the access terminal 600, external to the access terminal 600, and/or distributed across multiple entities).

Programming stored by the storage medium 606, when executed by the processing circuit 602, causes the processing circuit 602 to perform one or more of the various functions and/or process steps described herein. For example, the storage medium 606 may include cell acquisition and receiver power regulation operations 612. The cell acquisition and receiver power regulation operations 612 can be implemented by the processing circuit 602 to perform combined acquisition procedures with a cell and/or regulate power to one or more components of the receiver circuit 608 during such combined acquisition procedures. Thus, according to one or more aspects of the present disclosure, the processing circuit 602 is adapted to perform (in conjunction with the storage medium 606) any or all of the processes, functions, steps and/or routines for any or all of the access terminals 104 described herein As used herein, the term "adapted" in relation to the processing circuit 602 may refer to the processing circuit 602 being one or more of configured, employed, implemented, and/or programmed (in conjunction with the storage medium 606) to perform a particular process, function, step and/or routine according to various features described herein.

In operation, the access terminal 600 can conduct a combined acquisition procedure where one or more receiver components are powered down or OFF after detection of a Frequency Correction Channel (FCCH) and powered up or ON before reception of a transmission on a subsequent channel, such as the Synchronization Channel (SCH) or a subsequent Frequency Correction Channel (FCCH). For example, referring to FIG. 7, the access terminal 600 can open a first (or FCCH) receive window 702 by powering ON one or more components of the receiver circuit 608 to monitor the control channel carrier to detect a Frequency Correction Channel (FCCH). After the access terminal 600 detects the radio burst transmitted during the Frequency Correction Channel (FCCH) from a particular cell (e.g., from a particular base station), the access terminal 600 can power down or OFF 704 at least a portion of the receiver circuit 608 for the period of time between the detected transmission and an expected Synchronization Channel (SCH) transmission. In at least some examples, the access terminal 600 may power down or OFF one or more components associated with a data path (e.g., antenna, amplifiers, filters, mixers) while keeping powered up or ON one or more components associated with a frequency path (e.g., a phase-locked loop (PLL) component). This can reduce the amount of time it takes to power up or ON the receiver circuit 608 to receive the expected Synchronization Channel (SCH) transmission, while also providing significant power savings.

The access terminal 600 can monitor the time that has passed since the Frequency Correction Channel (FCCH) frame began to determine when to open a second (or SCH) receive window 706 for detecting the Synchronization Channel (SCH) transmission. For example, as noted above, the Synchronization Channel (SCH) frame may be about 4.615 ms after the beginning of the Frequency Correction Channel (FCCH) frame. Therefore, the access terminal 600 can open the second receive window 706 by powering up or ON those components of the receiver circuit 608 that were powered down or OFF, a sufficient amount of time prior to the expected Synchronization Channel (SCH) frame to ensure that the receiver circuit 608 is ready to receive the Synchronization Channel (SCH) transmission.

In this example, the access terminal 600 can power down or OFF one or more components of the receiver circuit 608 for a plurality of burst periods. According to at least some examples, the access terminal 600 employing the foregoing power regulations of the receiver circuit 608 may power down or OFF at least a portion of the receiver circuit 608 for about 4-6 burst periods of the Frequency Correction Channel (FCCH) frame.

Figure 8:
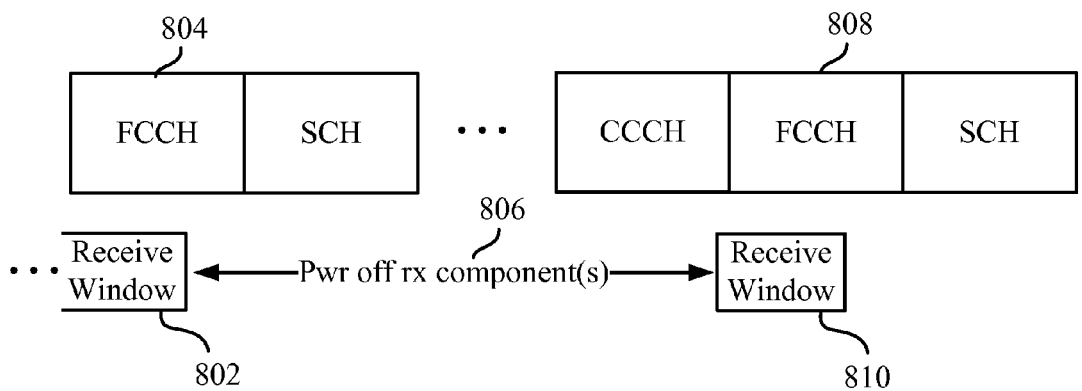
FIG. 8 is a block diagram illustrating an example of powering down one or more components of a receiver circuit between consecutive FCCH frames according to some embodiments.

In another example, depicted in FIG. 8, the access terminal 600 may detect the Frequency Correction Channel (FCCH) radio burst including the fixed tone, but the fixed tone may not be sufficiently reliable to continue the acquisition procedure. For instance, the access terminal 600 may be unable to accurately decode the received radio burst including the fixed tone. In such instances, the access terminal 600 typically waits for the next Frequency Correction Channel (FCCH) transmission before completing the acquisition procedure by detecting and decoding the subsequent Synchronization Channel (SCH) transmission. Instead of keeping a receive window open for the entire time between the two Frequency Correction Channel (FCCH) frames, the access terminal 600 may, as depicted in FIG. 8, power down or OFF one or more components of the receiver circuit 608 between the two Frequency Correction Channel (FCCH) frames. More specifically, the access terminal 600 may open a receive window 802 to detect the Frequency Correction Channel (FCCH) transmission during the Frequency Correction Channel (FCCH) frame 804. After detecting the Frequency Correction Channel (FCCH) transmission and determining that the fixed tone is not sufficiently reliable, the access terminal 600 can power down or OFF 806 at least a portion of the receiver circuit 608 for the period of time between the detected transmission and the next expected Frequency Correction Channel (FCCH) frame 808.

Figure 7:
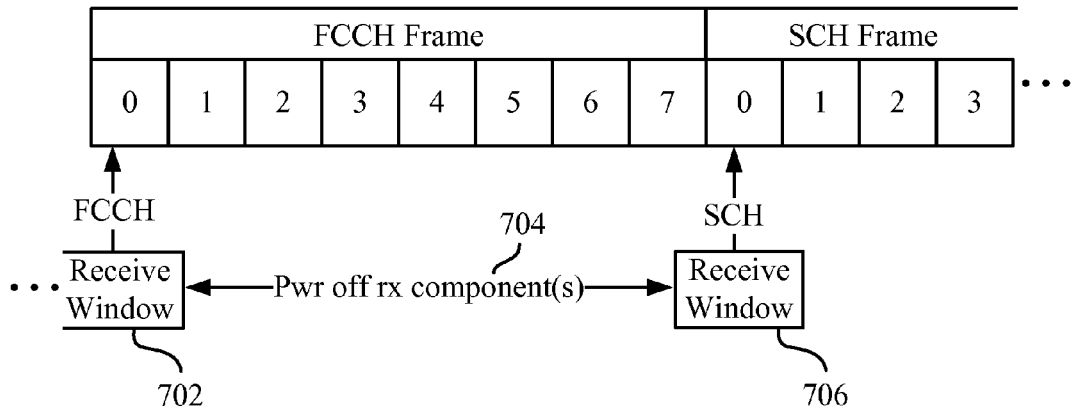
FIG. 7 is a block diagram illustrating an example of powering down one or more components of a receiver circuit between receipt of a FCCH transmission and a SCH frame according to some embodiments.

Similar to the example in FIG. 7, the access terminal 600 may know the amount of time between the consecutive Frequency Correction Channel (FCCH) frames 804 and 808. For example, referring to the examples of 51-frame multiframe structures depicted in FIGS. 3 and 4, the Frequency Correction Channel (FCCH) frames are 10 or 11 frames apart. The access terminal 600 can, therefore, monitor the time that has passed since the Frequency Correction Channel (FCCH) transmission was detected to determine when to open a subsequent receive window 810 for detecting the next Frequency Correction Channel (FCCH) frame. After the Frequency Correction Channel (FCCH) transmission is detected and the fixed tone is determined to be sufficiently reliable, the access terminal 600 can employ the features described above with reference to FIG. 7 to power off the receiver circuit 608 between the Frequency Correction Channel (FCCH) transmission and the Synchronization Channel (SCH) transmission.

Figure 9:
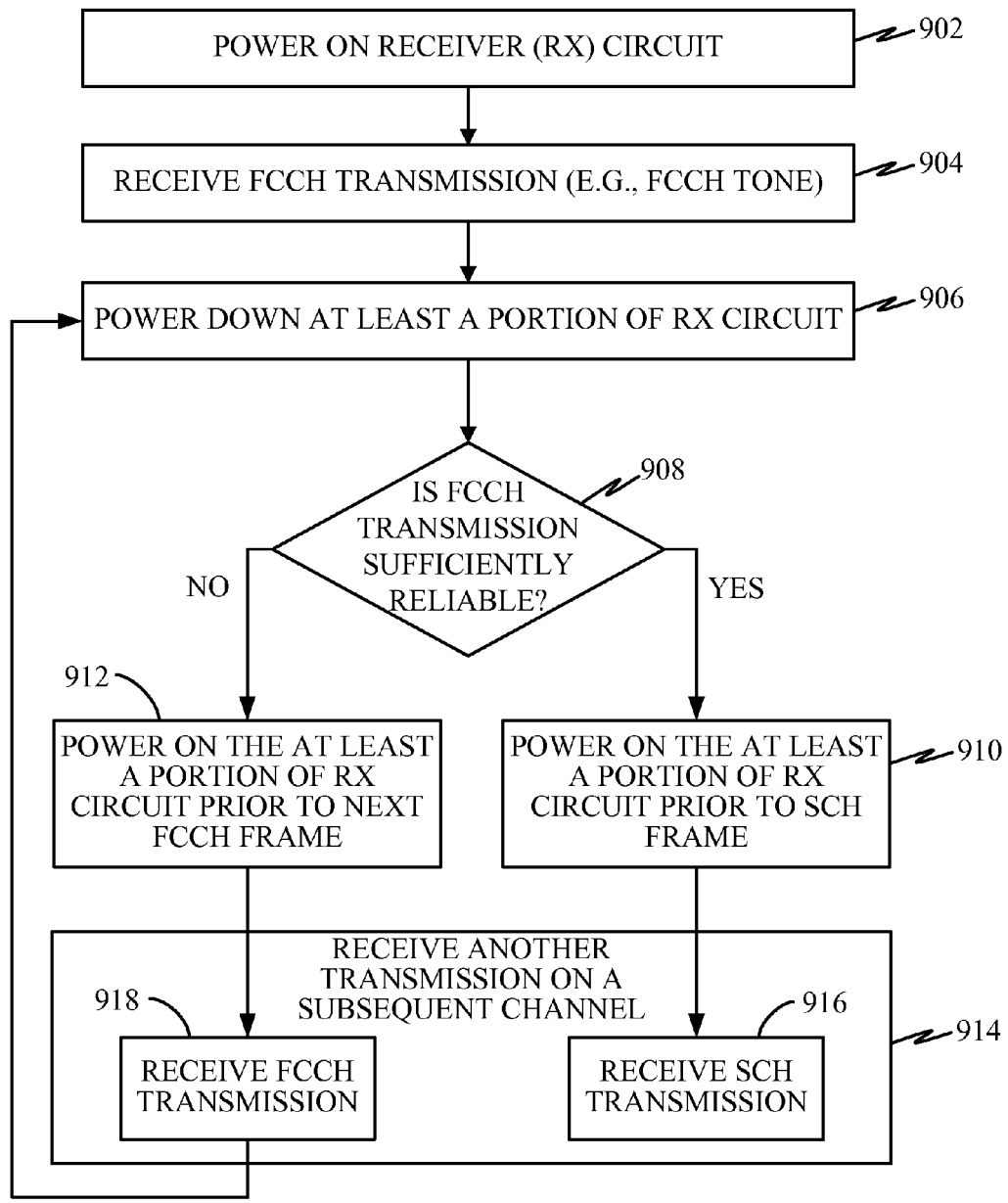
FIG. 9 is a flow diagram illustrating a method operational on an access terminal according to some embodiments.

According to at least one aspect of the present disclosure, methods operational on an access terminal are provided for managing power to one or more receiver circuit components. FIG. 9 is a flow diagram illustrating a method operational on an access terminal, such as the access terminal 600, according to at least one example. Referring to FIGS. 6 and 9, an access terminal 600 may power up (e.g., power ON) its receiver circuit 608 at step 902. For example, the processing circuit 602 executing the cell acquisition and receiver power regulation operations 612 may power up the receiver circuit 608. That is, the processing circuit 602 can enable each of the components of the receiver circuit 608 to receive sufficient power to facilitate reception of wireless transmissions. In at least some examples, the receiver circuit 608 may be powered up or ON to monitor a control channel carrier associated with a neighboring base station as part of a combined acquisition procedure.

At step 904, the access terminal 600 may receive a transmission on the Frequency Correction Channel (FCCH). For example, the processing circuit 602 may receive a Frequency Correction Channel (FCCH) transmission via the receiver circuit 608 of the communications interface 604. The Frequency Correction Channel (FCCH) transmission can include a Frequency Correction Channel (FCCH) tone, and the processing circuit 602 may process the Frequency Correction Channel (FCCH) tone as part of the combined acquisition procedure. Such processing may include conditioning the received transmission signal, decoding the received transmission signal, and/or other processing to the received transmission signal.

At step 906, the access terminal 600 can power down at least a portion of the receiver circuit 608. For example, the processing circuit 602 executing the cell acquisition and receiver power regulation operations 612 can power down (e.g., reduce power to, or power OFF) one or more components of the receiver circuit 608 following receipt of the Frequency Correction Channel (FCCH) transmission at step 904. In some instances, the processing circuit 602 may reduce or stop power to one or more components of the receiver circuit 608 associated with a data path (e.g., antenna, amplifiers, filters, mixers). In some instances, the processing circuit 602 may retain power to one or more components associated with a frequency path (e.g., a phase-locked loop (PLL) component).

At decision diamond 908, the access terminal 600 can determine whether the received Frequency Correction Channel (FCCH) transmission (e.g., tone) is sufficiently reliable. For example, the processing circuit 602 executing the cell acquisition and receiver power regulation operations 612 may make a determination following the receipt of the Frequency Correction Channel (FCCH) transmission at step 904 whether the Frequency Correction Channel (FCCH) transmission was successfully received. For instance, the processing circuit 602 executing the cell acquisition and receiver power regulation operations 612 can determine whether the Frequency Correction Channel (FCCH) transmission received at step 904 is successfully decoded and/or whether the signal-to-noise ratio (SNR) is poor (e.g., below a predefined threshold).

If the Frequency Correction Channel (FCCH) transmission is sufficiently reliable, the power to at least a portion of the receiver circuit 608 can remain down or OFF until an expected Synchronization Channel (SCH) frame. At step 910, the access terminal 600 may power up or ON the one or more components of the receiver circuit 608 prior to the expected Synchronization Channel (SCH) frame. For example, the processing circuit 602 executing the cell acquisition and receiver power regulation operations 612 can monitor the amount of time that has passed since the successful Frequency Correction Channel (FCCH) frame began to determine when the Synchronization Channel (SCH) frame is expected. As noted above, the Synchronization Channel (SCH) frame is about 4.615 ms after the beginning of the Frequency Correction Channel (FCCH) frame. The processing circuit 602 executing the cell acquisition and receiver power regulation operations 612 can accordingly power up or ON the one or more components of the receiver circuit 608 a sufficient amount of time prior to the expected Synchronization Channel (SCH) frame.

On the other hand, when the Frequency Correction Channel (FCCH) transmission is not sufficiently reliable, the power to at least a portion of the receiver circuit 608 can remain down or OFF until the next Frequency Correction Channel (FCCH) frame. At step 912, the access terminal 600 may power up or ON the one or more components of the receiver circuit 608 prior to the next Frequency Correction Channel (FCCH) frame. For example, processing circuit 602 executing the cell acquisition and receiver power regulation operations 612 can monitor the amount of time that has passed since the unsuccessful Frequency Correction Channel (FCCH) frame began to determine when the next Frequency Correction Channel (FCCH) frame is expected. As noted above with reference to the 51-frame multiframe structures depicted in FIGS. 3 and 4, the Frequency Correction Channel (FCCH) frames are either 10 or 11 frames apart. The processing circuit 602 executing the cell acquisition and receiver power regulation operations 612 can accordingly power up or ON the one or more components of the receiver circuit 608 a sufficient amount of time prior to the next expected Frequency Correction Channel (FCCH) frame.

With the one or more components of the receiver circuit 608 powered up or ON, the access terminal 600 can receive another transmission on a subsequent channel at step 914. For example, the processing circuit 602 executing the cell acquisition and receiver power regulation operations 612 can receive the other transmission on a subsequent channel via the receiver circuit 608. If the Frequency Correction Channel (FCCH) transmission was sufficiently reliable at 908, the other transmission on the subsequent channel can be a transmission received on the subsequent Synchronization Channel (SCH) at step 916 to complete a combined acquisition procedure. On the other hand, if the Frequency Correction Channel (FCCH) transmission was not sufficiently reliable at 908, the other transmission on the subsequent channel can be a transmission received on the subsequent Frequency Correction Channel (FCCH) at step 918. Following receipt of the subsequent Frequency Correction Channel (FCCH) at step 918, the access terminal 600 can return to step 906.

While the above discussed aspects, arrangements, and embodiments are discussed with specific details and particularity, one or more of the components, steps, features and/or functions illustrated in FIGS. 1, 2, 3, 4, 5, 6, 7, 8 and/or 9 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2 and/or 6 may be configured to perform or employ one or more of the methods, features, parameters, or steps described in FIGS. 3, 4, 5, 7, 8 and/or 9. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
    a communications interface including a receiver circuit;
    a storage medium; and
    a processing circuit coupled to the communications interface and the storage medium, the processing circuit configured to:
    detect a Frequency Correction Channel (FCCH) transmission via the receiver circuit;
    power down at least a portion of the receiver circuit as a result of the detection of the Frequency Correction Channel (FCCH) transmission;
    power up the at least a portion of the receiver circuit a period of time after the at least a portion of the receiver circuit is powered down, wherein the period of time is based on an amount of time between the Frequency Correction Channel (FCCH) transmission and an expected transmission on a subsequent channel; and
    receive the expected transmission on the subsequent channel via the receiver circuit.

2. The access terminal of claim 1, wherein the expected transmission on the subsequent channel is a Synchronization Channel (SCH) transmission on a Synchronization Channel (SCH) following the Frequency Correction Channel (FCCH).

3. The access terminal of claim 1, wherein the processing circuit is further configured to: determine whether the detected Frequency Correction Channel (FCCH) transmission is unreliable.

4. The access terminal of claim 3, wherein, if the detected Frequency Correction Channel (FCCH) transmission is unreliable, the expected transmission on the subsequent channel is another Frequency Correction Channel (FCCH) transmission on a subsequent Frequency Correction Channel (FCCH).

5. The access terminal of claim 1, wherein the processing circuit is configured to power down one or more components associated with a data path while one or more components associated with a frequency path remain powered up.

6. The access terminal of claim 5, wherein the one or more components associated with the data path include at least one component selected from a group of components comprising an antenna, a filter, an amplifier, and a mixer.

7. The access terminal of claim 5, wherein the one or more components associated with the frequency path includes a phase-locked loop (PLL) component.

8. A method operational on an access terminal, comprising:
    detecting a Frequency Correction Channel (FCCH) transmission;
    powering down at least a portion of a receiver circuit as a result of the detection of the Frequency Correction Channel (FCCH) transmission;

powering up the at least a portion of the receiver circuit a period of time after the at least a portion of the receiver circuit is powered down, wherein the period of time is based on an amount of time between the Frequency Correction Channel (FCCH) transmission and an expected transmission on a subsequent channel; and receiving the expected transmission on the subsequent channel.

9. The method of claim 8, wherein the expected transmission on the subsequent channel is a Synchronization Channel (SCH) transmission on a Synchronization Channel (SCH) following the Frequency Correction Channel (FCCH).

10. The method of claim 8, further comprising: determining whether the detected Frequency Correction Channel (FCCH) transmission is unreliable.

11. The method of claim 10, wherein, if the detected Frequency Correction Channel (FCCH) transmission is unreliable, the expected transmission on the subsequent channel is another Frequency Correction Channel (FCCH) transmission on a subsequent Frequency Correction Channel (FCCH) frame.

12. The method of claim 8, wherein powering down at least a portion of the receiver circuit after the detection of the Frequency Correction Channel (FCCH) transmission comprises: powering down one or more components associated with a data path;

and retaining one or more components associated with a frequency path powered up.

13. The method of claim 12, wherein powering down one or more components associated with a data path comprises: powering down one or more components selected from a group of components comprising an antenna, a filter, an amplifier, and a mixer.

14. The method of claim 12, wherein retaining one or more components associated with a frequency path powered up comprises: retaining a phase-locked loop (PLL) component powered up.

15. An access terminal, comprising:

means for detecting a Frequency Correction Channel (FCCH) transmission;

means for powering down at least a portion of a receiver circuit as a result of the detection of the Frequency Correction Channel (FCCH) transmission;

means for powering up the at least a portion of the receiver circuit a period of time after the at least a portion of the receiver circuit is powered down, wherein the period of time is based on an amount of time between the Frequency Correction Channel (FCCH) transmission and an expected transmission on a subsequent channel; and means for receiving the expected transmission on the subsequent channel.

16. The access terminal of claim 15, wherein the expected transmission on the subsequent channel is a Synchronization Channel (SCH) transmission on a Synchronization Channel (SCH) following the Frequency Correction Channel (FCCH).

17. The access terminal of claim 15, further comprising: means for determining whether the detected Frequency Correction Channel (FCCH) transmission is unreliable.

18. The access terminal of claim 17, wherein, if the detected Frequency Correction Channel (FCCH) transmission is unreliable, the expected transmission on the subsequent channel is another Frequency Correction Channel (FCCH) transmission on a subsequent Frequency Correction Channel (FCCH) frame.

19. The access terminal of claim 15, wherein powering down at least a portion of the receiver circuit after receiving the Frequency Correction Channel (FCCH) transmission comprises: powering down one or more components associated with a data path; and retaining one or more components associated with a frequency path powered up.

20. A non-transitory computer-readable storage medium, comprising programming for causing a computer to:

detect a Frequency Correction Channel (FCCH) transmission;

power down at least a portion of a receiver circuit as a result of the detection of the Frequency Correction Channel (FCCH) transmission;

power up the at least a portion of the receiver circuit a period of time after the at least a portion of the receiver circuit is powered down wherein the period of time is based on an amount of time between the Frequency Correction Channel (FCCH) transmission and an expected transmission on a subsequent channel; and receive the expected transmission on a-the subsequent channel.

21. The computer-readable storage medium of claim 20, wherein the expected transmission on the subsequent channel is a Synchronization Channel (SCH) transmission on a Synchronization Channel (SCH) following the Frequency Correction Channel (FCCH).

22. The computer-readable storage medium of claim 20, further comprising programming for causing a computer to: determine whether the detected Frequency Correction Channel (FCCH) transmission is unreliable.

23. The computer-readable storage medium of claim 22, wherein, if the detected Frequency Correction Channel (FCCH) transmission is unreliable, the expected transmission on the subsequent channel is another Frequency Correction Channel (FCCH) transmission on a subsequent Frequency Correction Channel (FCCH).

24. The computer-readable storage medium of claim 20, wherein the programming for causing a computer to power down at least a portion of a receiver circuit comprises programming for causing a computer to: power down one or more components associated with a data path while one or more components associated with a frequency path remain powered up.

* * * * *